US012650103B2

(12) United States Patent
Fujiwara

(10) Patent No.: US 12,650,103 B2
(45) Date of Patent: Jun. 9, 2026

(54) CONTROLLER FOR INTERNAL COMBUSTION ENGINE AND NON-TRANSITORY COMPUTER-READABLE STORAGE MEDIUM STORING PROGRAM FOR INTERNAL COMBUSTION ENGINE

(71) Applicant: TOYOTA JIDOSHA KABUSHIKI KAISHA, Toyota (JP)

(72) Inventor: Sho Fujiwara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/054,354

(22) Filed: Feb. 14, 2025

(65) Prior Publication Data

US 2025/0297589 A1 Sep. 25, 2025

(30) Foreign Application Priority Data

Mar. 21, 2024 (JP) ................................ 2024-045366

(51) Int. Cl.
*F02M 26/36* (2016.01)
*F02M 25/028* (2006.01)
*F02M 26/22* (2016.01)
*F02M 26/00* (2016.01)

(52) U.S. Cl.
CPC .......... *F02M 26/36* (2016.02); *F02M 25/028* (2013.01); *F02M 26/22* (2016.02); *F02M 2026/001* (2016.02)

(58) Field of Classification Search
CPC ...... F02M 26/36; F02M 25/028; F02M 26/22; F02M 2026/001; F02M 25/03; F02M 26/43
See application file for complete search history.

(56) References Cited

U.S. PATENT DOCUMENTS

| | | | | |
|---|---|---|---|---|
| 2015/0354437 | A1* | 12/2015 | Mulye | F02M 26/22 123/25 C |
| 2017/0114738 | A1* | 4/2017 | Hoard | F02M 26/07 |
| 2017/0138313 | A1* | 5/2017 | Fujimoto | F02M 25/03 |
| 2018/0094593 | A1* | 4/2018 | Leone | F02M 25/025 |
| 2018/0171935 | A1* | 6/2018 | McQuillen | F02M 25/0227 |
| 2018/0171936 | A1* | 6/2018 | McQuillen | F02M 25/0227 |
| 2019/0101065 | A1* | 4/2019 | Aoyagi | F02D 41/0065 |

FOREIGN PATENT DOCUMENTS

JP 2022-168929 A 11/2022

* cited by examiner

*Primary Examiner* — Sizo B Vilakazi
(74) *Attorney, Agent, or Firm* — Oblon, McClelland, Maier & Neustadt, L.L.P.

(57) ABSTRACT

An amount of condensed water generated in an EGR passage and flowing into one cylinder in a unit period is referred to as an EGR water amount. Memory stores information indicating a corresponding relationship between a parameter related to an operation state of an internal combustion engine and a parameter related to the EGR water amount for each cylinder. When the internal combustion engine is operating, a controller acquires a value obtained by subtracting the EGR water amount of each cylinder from a reference water amount that corresponds to the operation state of the internal combustion engine as a target water injection amount of each cylinder based on the information. The controller controls each water injection valve so that the water injection valve injects the target water injection amount of each cylinder.

4 Claims, 2 Drawing Sheets

CONTROLLER FOR INTERNAL COMBUSTION ENGINE AND NON-TRANSITORY COMPUTER-READABLE STORAGE MEDIUM STORING PROGRAM FOR INTERNAL COMBUSTION ENGINE

CROSS-REFERENCE TO RELATED APPLICATIONS

This application is based upon and claims the benefit of priority from Japanese Patent Application No. 2024-045366, filed on Mar. 21, 2024, the entire contents of which are incorporated herein by reference.

BACKGROUND

1. Field

The following description relates to a controller for an internal combustion engine and a non-transitory computer-readable storage medium storing a program for an internal combustion engine.

2. Description of Related Art

Japanese Laid-Open Patent Publication No. 2022-168929 discloses an internal combustion engine that includes an exhaust gas recirculation (EGR) passage. The EGR passage extends from an exhaust passage to an intake passage. The EGR passage draws some of exhaust gas flowing through the exhaust passage into the intake passage as EGR gas. The internal combustion engine further includes a plurality of water injection valves. The water injection valves are respectively provided for a plurality of cylinders.

In the internal combustion engine described in the above patent literature and including the EGR passage and the water injection valves, an EGR cooler for cooling the EGR gas may be arranged in the EGR passage. Such a structure may cause condensation of moisture contained in the EGR gas in the EGR passage. The condensed water flows into the cylinders through the intake passage together with the EGR gas. The amount of condensed water flowing into each cylinder may differ between different cylinders due to various factors including, for example, the manner in which the gas flows into the cylinders in correspondence with the shape of the intake passage. If the same amount of water is injected through each of the water injection valves under a condition in which various amounts of condensed water are flowing into the cylinders, the total amount of the water that reaches each cylinder may differ between different cylinders. As a result, the cylinders may be in different combustion states.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a controller for an internal combustion engine is provided. The internal combustion engine includes an engine main body in which a plurality of cylinders are defined, a plurality of water injection valves respectively provided for the plurality of cylinders and configured to supply water to the plurality of cylinders, an exhaust gas recirculation (EGR) passage configured to draw some of exhaust gas flowing through an exhaust passage into an intake passage as an EGR gas, and an EGR cooler arranged in the EGR passage and configured to cool the EGR gas. The controller includes processing circuitry and a storage unit. An amount of condensed water generated in the EGR passage and flowing into one of the plurality of cylinders during a unit period is referred to as an EGR water amount. The storage unit stores information indicating a corresponding relationship between an operation parameter related to an operation state of the internal combustion engine and a water amount parameter related to the EGR water amount for each of the plurality of cylinders. When the internal combustion engine is operating, the processing circuitry is configured to execute a first process for each of the plurality of cylinders based on the information. The first process acquires a target water injection amount of a subject cylinder of the plurality of cylinders by subtracting the EGR water amount of the subject cylinder from a reference water amount that corresponds to the operation state of the internal combustion engine. When the internal combustion engine is operating, the processing circuit is configured to execute a second process that controls the plurality of water injection valves so that the water injection valves each injects the target water injection amount.

In another general aspect, a non-transitory computer-readable storage medium storing a program for an internal combustion engine is provided. The internal combustion engine includes an engine main body in which a plurality of cylinders are defined, a plurality of water injection valves respectively provided for the plurality of cylinders and configured to supply water to the plurality of cylinders, an exhaust gas recirculation (EGR) passage configured to draw some of exhaust gas flowing through an exhaust passage into an intake passage as an EGR gas, and an EGR cooler arranged in the EGR passage and configured to cool the EGR gas. An amount of condensed water generated in the EGR passage and flowing into one of the plurality of cylinders during a unit period is referred to as an EGR water amount. A controller for the internal combustion engine stores information indicating a corresponding relationship between an operation parameter related to an operation state of the internal combustion engine and a water amount parameter related to the EGR water amount for each of the plurality of cylinders. When the internal combustion engine is operating, the program causes the controller to execute a first process for each of the plurality of cylinders based on the information. The first process acquires a target water injection amount of a subject cylinder of the plurality of cylinders by subtracting the EGR water amount of the subject cylinder from a reference water amount that corresponds to the operation state of the internal combustion engine. When the internal combustion engine is operating, the program causes the controller to execute a second process that controls the plurality of water injection valves so that the water injection valves each injects the target water injection amount.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, “at least one of A and B” should be understood to mean “only A, only B, or both A and B.”

First Embodiment

Figure 1:
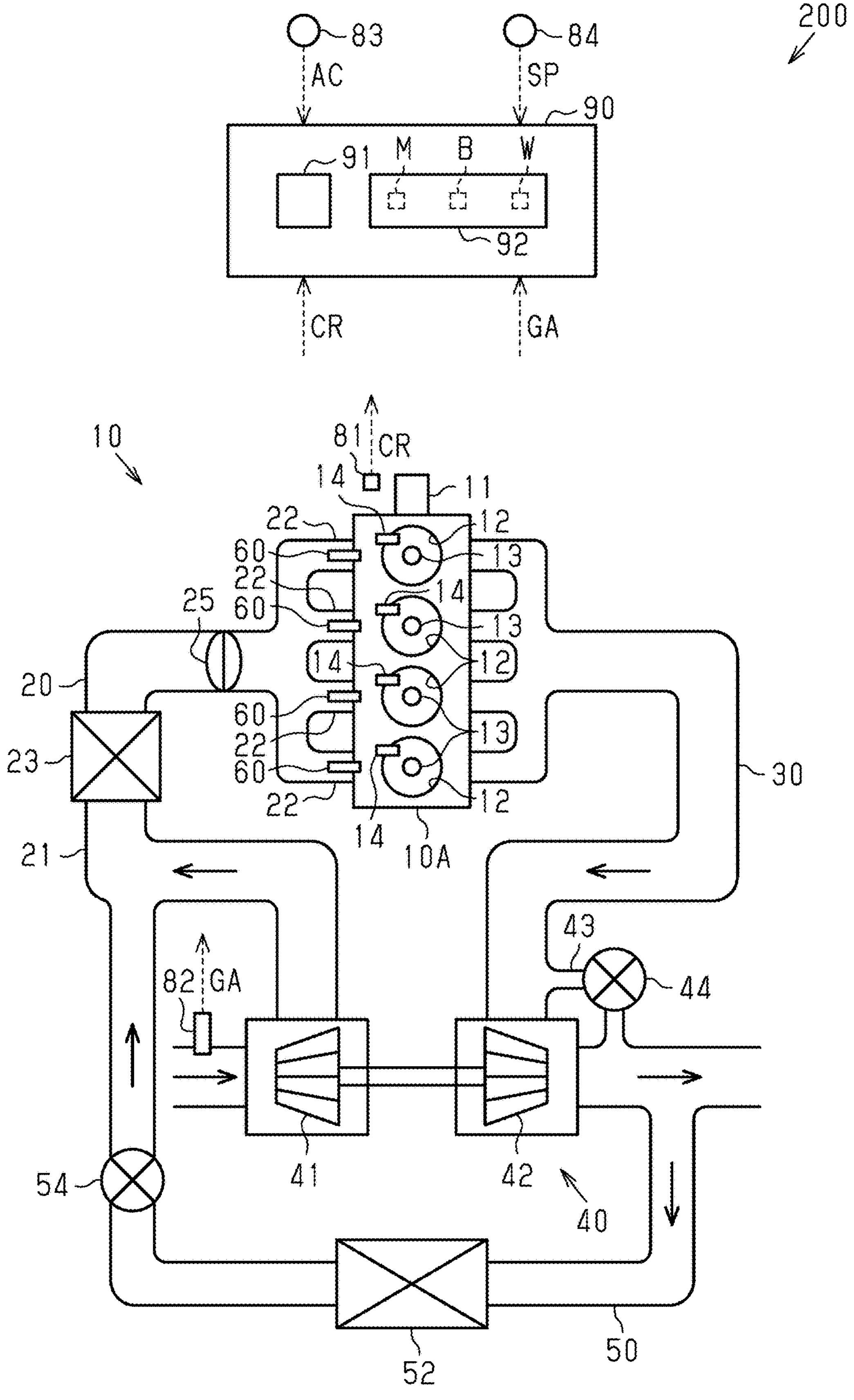
FIG. 1 is a schematic diagram showing the structure of an internal combustion engine.

Hereinafter, a first embodiment of a controller for an internal combustion engine will be described with reference to the drawings. As shown in FIG. 1, a vehicle 200 includes an internal combustion engine 10. The internal combustion engine 10 is a driving source of the vehicle 200. The internal combustion engine 10 includes an engine main body 10A and a crankshaft 11. The engine main body 10A is provided with a plurality of cylinders 12. The number of the cylinders 12 is four. The cylinders 12 are compartments partitioned by the engine main body 10A. The cylinders 12 are compartments for burning a mixture of intake air and fuel. Each cylinder 12 accommodates a piston (not shown). The piston reciprocates in the cylinder 12 in response to combustion of the air-fuel mixture. The crankshaft 11 rotates as the piston reciprocates.

The internal combustion engine 10 includes a plurality of spark plugs 13 and a plurality of fuel injection valves 14. The spark plugs 13 are provided for the respective cylinders 12. The spark plug 13 ignites the air-fuel mixture in the cylinder 12 by producing spark discharge. Each fuel injection valve 14 is disposed in a corresponding cylinder 12. The fuel injection valve 14 of the present embodiment injects fuel directly into the cylinder 12 without passing through an intake passage 20, which will be described later. The fuel injection valve 14 injects hydrogen gas as fuel.

The internal combustion engine 10 includes the intake passage 20. The intake passage 20 draws intake air into the cylinders 12. The intake passage 20 includes an upstream passage 21 and a plurality of branch passages 22. The upstream passage 21 is connected to the four cylinders 12 via four branch passages 22. The branch passages 22 are provided for respective cylinders 12. The branch passages 22 are connected to a downstream end of the upstream passage 21. The branch passages 22 lead to the corresponding cylinders 12. That is, the plurality of branch passages 22 branch into the respective cylinders 12 at the downstream end of the upstream passage 21.

The internal combustion engine 10 includes an intercooler 23 and a throttle valve 25. The throttle valve 25 is positioned in the upstream passage 21. The opening degree of the throttle valve 25 is adjustable. An intake air amount GA changes according to the opening degree of the throttle valve 25. The intercooler 23 is located at the upstream side of the throttle valve 25 in the upstream passage 21. The intercooler 23 cools the inside of the upstream passage 21. In FIG. 1, the flow of gas in each passage is indicated by arrows.

The internal combustion engine 10 includes a plurality of water injection valves 60. One water injection valve 60 is provided for each of the plurality of cylinders 12. The water injection valve 60 injects water into the cylinder 12 through the branch passage 22. That is, each water injection valve 60 supplies water to the corresponding cylinder 12.

The internal combustion engine 10 includes an exhaust passage 30. The exhaust passage 30 is a passage for discharging exhaust gas generated in the four cylinders 12. The exhaust passage 30 is connected to the four cylinders 12.

The internal combustion engine 10 includes a forced-induction device 40. The forced-induction device 40 extends across the intake passage 20 and the exhaust passage 30. The forced-induction device 40 includes a compressor wheel 41, a turbine wheel 42, a bypass passage 43, and a wastegate (WG) valve 44. The compressor wheel 41 is positioned on the upstream side of the intercooler 23 in the upstream passage 21. The turbine wheel 42 is located in the exhaust passage 30. The turbine wheel 42 is rotated by the flow of exhaust. The compressor wheel 41 rotates integrally with the turbine wheel 42. When the compressor wheel 41 rotates, the compressor wheel 41 compresses and sends out intake air. That is, the compressor wheel 41 performs forced induction of the intake air flowing through the upstream passage 21. The bypass passage 43 connects an upstream section and a downstream section of the exhaust passage 30 with respect to the turbine wheel 42. That is, the bypass passage 43 is a passage that bypasses the turbine wheel 42. The WG valve 44 is positioned in the bypass passage 43. The opening degree of the WG valve 44 can be adjusted. As the opening degree of the WG valve 44 decreases, the amount of the exhaust gas flowing through the bypass passage 43 decreases. In addition, the amount of the exhaust gas passing through the turbine wheel 42 increases. As a result, the rotational speeds of the turbine wheel 42 and the compressor wheel 41 increase. Then, the supercharging pressure becomes high.

The internal combustion engine 10 includes an EGR passage 50, an EGR cooler 52, and an EGR valve 54. The EGR passage 50 connects a portion of the exhaust passage 30 on the downstream side of the turbine wheel 42 and a portion of the intake passage 20 between the compressor wheel 41 and the intercooler 23. The EGR passage 50 is a passage for introducing some of the exhaust gas flowing through the exhaust passage 30 into the intake passage 20 as EGR gas. The EGR cooler 52 is positioned in the EGR passage 50. The EGR cooler 52 cools the EGR gas flowing through the EGR passage 50. The EGR valve 54 is positioned on the intake passage 20 side with respect to the EGR cooler 52 in the EGR passage 50. The opening degree of the EGR valve 54 can be adjusted. The amount of EGR gas flowing through the EGR passage 50 changes in accordance with the opening degree of the EGR valve 54.

The internal combustion engine 10 includes a plurality of sensors. For example, the internal combustion engine 10 includes a crank position sensor 81 and an air flow meter 82. The crank position sensor 81 is located in the vicinity of the crankshaft 11. The crank position sensor 81 detects a rotational position CR of the crankshaft 11. The air flow meter 82 is located on the upstream side of the compressor wheel 41 in the intake passage 20. The air flow meter 82 detects an intake air amount GA. The vehicle 200 also includes an accelerator sensor 83 and a vehicle speed sensor 84. The accelerator sensor 83 detects a depression amount of an accelerator pedal in the vehicle 200 as an accelerator operation amount AC. The vehicle speed sensor 84 detects a traveling speed of the vehicle 200 as a vehicle speed SP. Each of these sensors detects information and repeatedly transmits a signal corresponding to the detected information to the controller 90, which will be described below.

Overall Configuration of Controller

The vehicle 200 includes a controller 90. The controller 90 includes a central processing unit (CPU) 91 and memory 92. The CPU 91 is an execution unit. The memory 92 includes three types of memories, that is, a random access memory (RAM), a read only memory (ROM), and an electrically rewritable nonvolatile memory. In the present embodiment, these three types of storage media are collectively referred to as the memory 92. The memory 92 is a storage unit. The memory 92 stores, in advance, various programs W for the internal combustion engine 10 in which processes to be executed by the CPU 91 are described, and various types of information required for the CPU 91 to execute the programs W. The control subject of the CPU 91 is the internal combustion engine 10. The CPU 91 controls various parts of the internal combustion engine 10 by executing the program W. Note that an example of the various data stored in the memory 92 is identification information for distinguishing the plurality of cylinders 12. In the present embodiment, a cylinder number assigned in advance to each cylinder 12 is employed as an example of the identification information. That is, the values "1" to "4" are sequentially assigned to the four cylinders 12.

The CPU 91 repeatedly receives detection signals from various sensors mounted in the vehicle 200 while the ignition switch of the vehicle 200 is turned on. The CPU 91 calculates various parameters necessary for controlling the internal combustion engine 10 based on the received detection signals. For example, the CPU 91 calculates an engine rotation speed NE, which is the rotation speed of the crankshaft 11, based on the rotational position CR of the crankshaft 11. Further, the CPU 91 calculates an engine load factor KL based on the engine rotation speed NE and the intake air amount GA. The engine load factor KL is a parameter that determines the amount of air delivered to the cylinders 12. Specifically, the engine load factor KL is a value obtained by dividing the amount of air flowing into one cylinder 12 per combustion cycle by a reference amount of air. The reference air amount changes depending on the engine rotation speed NE. One combustion cycle is a series of periods in which one cylinder 12 undergoes an intake stroke, a compression stroke, an expansion stroke, and an exhaust stroke once each.

The CPU 91 performs the following processing when controlling the internal combustion engine 10. The CPU 91 repeatedly calculates the target torque of the internal combustion engine 10 based on the accelerator operation amount AC, the vehicle speed SP, and the like during a period in which the ignition switch of the vehicle 200 is on. Then, the CPU 91 controls the throttle valve 25, the fuel injection valves 14, and the spark plugs 13 so as to obtain the latest target torque. That is, the CPU 91 adjusts the opening degree of the throttle valve 25, adjusts the fuel injection amount from the fuel injection valves 14, and adjusts the ignition timing of the spark plugs 13. Through these controls, the CPU 91 repeats the combustion of the air-fuel mixture in each of the cylinders 12. That is, the CPU 91 operates the internal combustion engine 10. When the internal combustion engine 10 is operated, the CPU 91 adjusts the opening degree of the WG valve 44 and the opening degree of the EGR valve 54 based on the target torque, the engine rotation speed NE, the engine load factor KL, and the like.

Water Amount Information

In the EGR passage 50, the EGR gas is cooled by the EGR cooler 52 located in the EGR passage 50. As a result, moisture contained in the EGR gas is condensed in the EGR passage 50. Hereinafter, of the condensed water generated in the EGR passage 50, the amount of condensed water flowing into one cylinder 12 in a predetermined unit period will be referred to as an EGR water amount Q. The unit period of the present embodiment is one combustion cycle.

Figure 2:
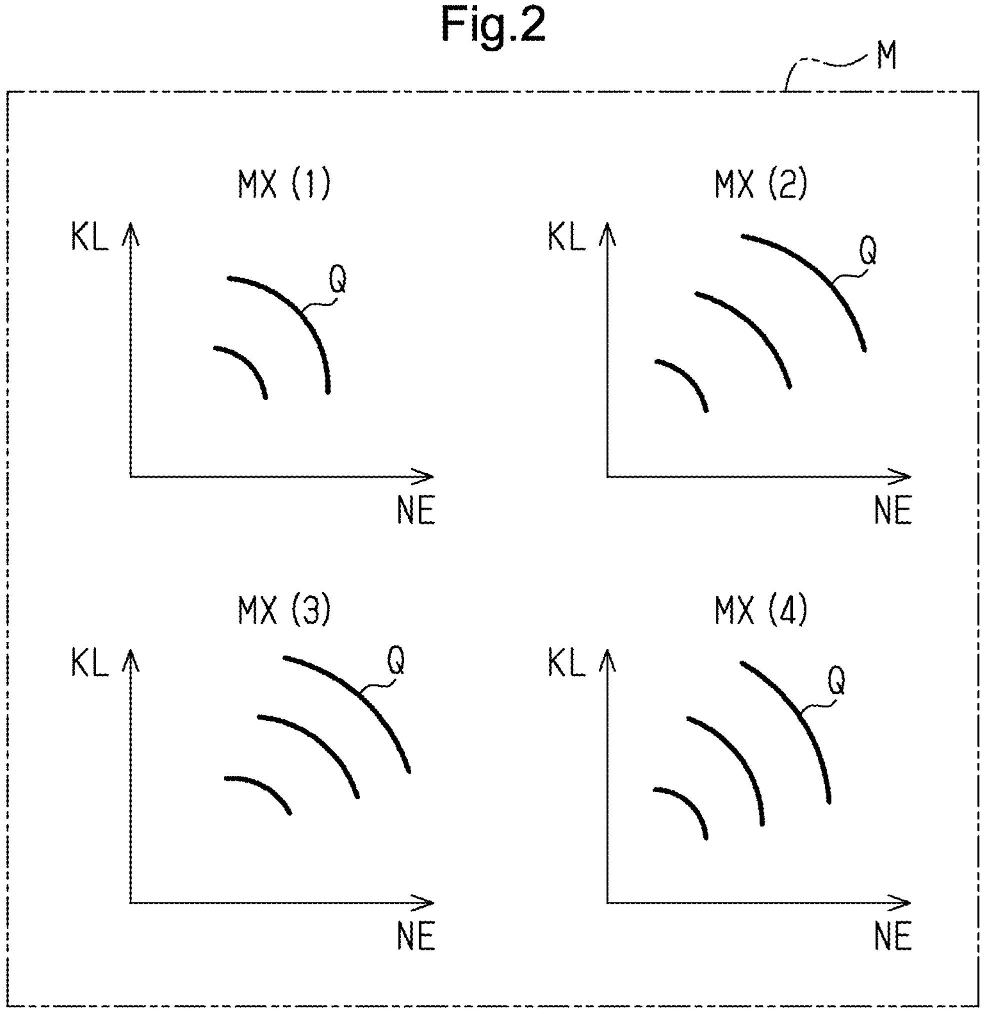
FIG. 2 is a diagram schematically illustrating water amount information.

As shown in FIG. 1, the memory 92 stores water amount information M in advance. As shown in FIG. 2, the water amount information M is information representing a corresponding relationship between an operation parameter and a water amount parameter for each cylinder 12. The operation parameter is a parameter related to an operation state of the internal combustion engine 10. The water amount parameter is a parameter related to the EGR water amount Q. Specific contents of the operation parameter and the water amount parameter will be described later. Hereinafter, information representing the corresponding relationship for a certain cylinder 12 will be referred to as a dedicated map MX. That is, the water amount information M is a group of the dedicated maps MX for the four cylinders 12. Each dedicated map MX is provided with the cylinder number of the corresponding cylinder 12.

The dedicated map MX will be described in detail. In the present embodiment, the operation parameters that define the dedicated map MX are the engine rotation speed NE and the engine load factor KL. In the present embodiment, the water amount parameter that defines the dedicated map MX is the EGR water amount Q. That is, as shown in FIG. 2, the dedicated map MX is represented by orthogonal coordinates with the engine rotation speed NE as the X-axis and the engine load factor KL as the Y-axis. The dedicated map MX represents the EGR water amount Q for each combination of the engine rotation speed NE and the engine load factor KL. The dedicated map MX is created by performing an experiment or a simulation in which the internal combustion engine 10 is operated in various operation states with respect to the internal combustion engine 10 having the specification described in FIG. 1. As can be seen from the specification of the internal combustion engine 10, the experiment or simulation for creating the dedicated map MX is performed on the assumption that the fuel injected by each fuel injection valve 14 is hydrogen gas. The dedicated map MX and thus the water amount information M represent the corresponding relationship between the combination of the engine rotation speed NE and the engine load factor KL and the EGR water amount Q when the fuel of the internal combustion engine 10 is hydrogen gas. The experiment or the simulation for creating the dedicated map MX is performed on the assumption that the internal combustion engine 10 includes the forced-induction device 40. The content of the operation region in which the forced-induction device 40 operates in the dedicated map MX and the water amount information M represents the corresponding relationship between the engine rotation speed NE and the engine load factor KL, and the EGR water amount Q when the forced-induction device 40 is operating. The experiment or simulation for creating the dedicated map MX includes fluid analysis using so-called computational fluid dynamics (CFD). In the experiment or the simulation for creating the dedicated map MX, the dynamics of various elements related to the EGR water amount Q are analyzed for each operation state of the internal combustion engine 10. An example of the various factors is the temperature of gas flowing through various passages of the internal combustion engine 10, such as the intake passage 20, the exhaust passage 30, and the EGR passage 50. An example of the various factors is the amount of moisture contained in the gas flowing through various passages of the internal combustion engine 10. An example of the various elements is the manner in which the gas flows to each cylinder 12 in accordance with the shape of the branch from the upstream passage 21 to each branch passage 22. The dedicated map MX reflects these various elements.

As shown in FIG. 1, the memory 92 stores reference information B in advance. The reference information B is information indicating a corresponding relationship between the operation parameters and the reference water amount. As described above, the operation parameters are the engine rotation speed NE and the engine load factor KL. The reference water amount is the total amount of water that needs to be drawn into one cylinder 12 in the above-mentioned unit period with respect to a certain specific engine operation state. The reference information B is represented by orthogonal coordinates with the engine rotation speed NE as the X-axis and the engine load factor KL as the Y-axis. The reference information B represents the reference water amount for each combination of the engine rotation speed NE and the engine load factor KL. Similarly to the water amount information M, the reference information B is created by performing an experiment or simulation on the internal combustion engine 10 of the specification described in FIG. 1.

Water Injection Control

The CPU 91 controls the water injection valves 60. By executing the program W, the CPU 91 can execute water injection control for controlling the water injection valves 60. The CPU 91 repeatedly executes the water injection control described below during the operation of the internal combustion engine 10, that is, from when the ignition switch of the vehicle 200 is turned on to when the ignition switch is turned off.

Figure 3:
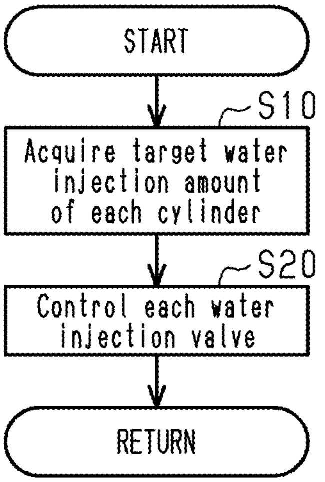
FIG. 3 is a flowchart illustrating the content of a process in a water injection control.

As shown in FIG. 3, the CPU 91 starts the water injection control from step S10. In step S10, the CPU 91 acquires a target water injection amount of each cylinder 12. The CPU 91 acquires the target water injection amount of each cylinder 12 in the following manner. First, the CPU 91 calculates a present reference water amount. The present reference water amount is a reference water amount that corresponds to the operation state of the internal combustion engine 10 at the present time. Specifically, the CPU 91 reads the reference information B from the memory 92. Then, the CPU 91 uses the reference information B to calculate the reference water amount that corresponds to the engine rotation speed NE and the engine load factor KL at the present time as the present reference water amount. Next, the CPU 91 calculates a present individual water amount. The present individual water amount is the EGR water amount Q in a subject cylinder 12 at the present time. Specifically, the CPU 91 reads the dedicated map MX of the subject cylinder 12 from the water amount information M in the memory 92. Then, the CPU 91 uses the dedicated map MX read from the memory 92 to calculate the EGR water amount Q that corresponds to the engine rotation speed NE and the engine load factor KL at the present time as the present individual water amount. Subsequently, the CPU 91 obtains the target water injection amount by subtracting the present individual water amount from the present reference water amount. In this manner, the CPU 91 calculates the target water injection amount of each of the cylinders 12. The CPU 91 calculating the target water injection amount corresponds to the CPU 91 acquiring the target water injection amount. That is, in step S10, the CPU 91 acquires the target water injection amount of each cylinder 12 using the reference information B and the water amount information M. When the CPU 91 acquires the target water injection amount of each of the cylinders 12, the CPU 91 proceeds to step S20. The process of step S10 corresponds to a first process.

In step S20, the CPU 91 controls the water injection valves 60, which are respectively provided for the cylinders 12, in accordance with the target water injection amount of each of the cylinders 12 acquired in step S10. One of the cylinders 12 will now be referred to as a subject cylinder. The CPU 91 is configured to execute a supplying process on the subject cylinder. The supplying process causes the water injection valve 60 of the subject cylinder to inject the target water injection amount corresponding to the subject cylinder during a single combustion cycle. A single combustion cycle corresponds to a unit period. In step S20, the CPU 91 repeats the supplying process on each of the cylinders 12. The CPU 91 continues to repeat the supplying process over a predetermined control period. Specifically, the CPU 91 controls the water injection valves 60 so that each of the water injection valves 60 injects the target water injection amount of the corresponding cylinder 12 in each unit period during the control period. The process of step S20 corresponds to a second process.

The control period is longer than the time required for a single combustion cycle in a state in which the internal combustion engine 10 is at the minimum engine rotation speed NE that allows for continued independent operation of the internal combustion engine 10, that is, an idling operation state of the internal combustion engine 10. In other words, the control period is longer than the unit period. When the control period elapses from the initiation of step S20, the CPU 91 ends the process of step S20. Then, the CPU 91 temporarily ends the series of processes of the water injection control. Thereafter, the CPU 91 immediately starts the process of step S10. That is, the CPU 91 performs the water injection control again.

Operation of the First Embodiment

The condensed water generated in the EGR passage 50 flows into the intake passage 20 together with the EGR gas. Then, the condensed water flows from the upstream passage 21 through the four branch passages 22 into the four cylinders 12. In this case, the amount of condensed water flowing into each cylinder 12 may differ between different cylinders 12 due to, for example, the manner in which the gas flows in correspondence with the shape of the upstream passage 21 that branches into the branch passages 22. In the present embodiment, in order to inject water from the water injection valves 60 taking into consideration such differences in the EGR water amount Q between the cylinders 12, the dedicated map MX is prepared in advance for each of the cylinders 12. The CPU 91 uses information obtained from the dedicated map MX of each of the cylinders 12 to calculate the target water injection amount of the cylinder 12 for the injection control. Specifically, the CPU 91 subtracts the EGR water amount Q, which is obtained from the dedicated map MX of the cylinder 12, from the reference water amount to calculate the target water injection amount of the cylinder 12. The value obtained as a result of this calculation corresponds to an amount of the reference water amount that exceeds the EGR water amount Q in the cylinder 12. The CPU 91 sets such a value as the target water injection amount of the cylinder 12 and causes the corresponding water injection valve 60 to inject water accordingly. When the water through the water injection valve 60 and the EGR water amount Q are drawn into the cylinder 12, the total amount of water drawn into the cylinder 12 becomes substantially equal to the reference water amount. That is, substantially the same amount of water is drawn into each of the cylinders 12.

Advantages of the First Embodiment (1) As described in the operation of the first embodiment, according to the configuration of the present embodiment, a substantially uniform amount of water is introduced into each cylinder 12. Therefore, it is possible to suppress variations in the combustion state among the cylinders 12.

A comparative example different from the present embodiment will be described next. In setting the target water injection amount for each cylinder 12, the reference water amount, which is a value common to the cylinders 12, may be set in advance to the following value. That is, the reference water amount is set in advance to a value that assumes that the uniform EGR water amount Q flows into flow into each cylinder 12. Then, the reference water amount is directly set as the target water injection amount of each cylinder 12. When such a mode is adopted, in order to avoid a shortage of the amount of water introduced into each cylinder 12, the expected EGR water amount Q can be set to a minimum value at which the water will flow into one cylinder 12 in accordance with the operation state of the internal combustion engine 10. Accordingly, the referent amount of water can be set to be larger. Here, as described above, the EGR water amount Q actually flowing into each cylinder 12 varies. Depending on the cylinder 12, the EGR water amount Q may be considerably larger than the expected amount. When the reference water amount based on the expected EGR water amount Q is injected from each water injection valve 60 to such a cylinder 12, a larger amount of water than necessary is introduced to the cylinder 12. That is, in this cylinder 12, water is injected from the water injection valve 60 in an amount larger than the shortage of the EGR water amount Q with respect to the originally required water amount. As a result, the amount of water consumed by the water injection valve 60 increases.

In contrast to the comparative example, in the configuration of the present embodiment, only the amount of the reference water amount that cannot be covered by the EGR water amount Q alone is injected from each water injection valve 60. Therefore, it is possible to minimize the amount of water injected from each water injection valve 60.

(2) In the internal combustion engine 10 using hydrogen gas as fuel, the amount of condensed water generated in the EGR passage 50 is larger than that in, for example, an internal combustion engine using gasoline as fuel. In order to reflect this point in the dedicated map MX, the dedicated map MX is created based on an experiment or a simulation on the assumption that the fuel of the internal combustion engine 10 is hydrogen gas. That is, the dedicated map MX takes into account the fact that the EGR water amount Q increases as hydrogen gas is used as fuel. When the target water injection amount is calculated using such a dedicated map MX, the target water injection amount can be calculated in consideration of the fact that the EGR water amount Q is large, and therefore, the target water injection amount is reduced accordingly. Therefore, it is possible to suppress the amount of water injected from each water injection valve 60.

(3) When the forced-induction device 40 is operating, the EGR water amount Q contained per unit volume of the gas increases due to the gas being compressed in the intake passage 20. In order to reflect this point in the dedicated map MX, the dedicated map MX is created based on an experiment or a simulation on the assumption that the internal combustion engine 10 includes the forced-induction device 40. That is, in the dedicated map MX, the content of the operation region in which the forced-induction device 40 operates is set in consideration of the fact that the EGR water amount Q increases as the forced-induction device 40 operates. When the target water injection amount is calculated by using the dedicated map MX, the target water injection amount can be calculated in consideration of the fact that the EGR water amount Q is large during the operation of the forced-induction device 40. Therefore, the target water injection amount is reduced accordingly. Therefore, it is possible to suppress the amount of water injected from each water injection valve 60.

Second Embodiment

A second embodiment of the controller for an internal combustion engine will be described. The second embodiment is different from the first embodiment only in the water amount information and the processing contents of step S10 related thereto. Therefore, in the following, the water amount information and the processing content of step S10 according to the second embodiment will be mainly described, and the description of the content overlapping with the first embodiment will be appropriately omitted or omitted.

A value obtained by subtracting the EGR water amount Q from the reference water amount in a specific engine operation state during the operation of the internal combustion engine 10 is referred to as a required water amount U. The water amount parameter of the second embodiment is the required water amount U. The dedicated map MX in the water amount information M of the second embodiment is represented by orthogonal coordinates in which the engine rotation speed NE is set as the X axis and the engine load factor KL is set as the Y axis. The dedicated map MX represents the required water amount U for each combination of the engine rotation speed NE and the engine load factor KL. Similarly to the first embodiment, the dedicated map MX is created in advance by an experiment or a simulation for the internal combustion engine 10 having the specification described in FIG. 1. That is, the dedicated map MX represents the corresponding relationship between the combination of the engine rotation speed NE and the engine load factor KL and the required water amount U in the case where the fuel of the internal combustion engine 10 is hydrogen gas. In the dedicated map MX, the content of the operation region in which the forced-induction device 40 operates represents the corresponding relationship between the combination of the engine rotation speed NE and the engine load factor KL and the required water amount U in a case where the forced-induction device 40 is operating. The memory 92 stores a group of such dedicated maps MX created in advance for the respective cylinders 12 as the water amount information M.

In step S10 of the water injection control, the CPU 91 acquires the target water injection amount for each of the cylinders 12 as follows. To acquire the target water injection amount of one of the cylinders 12, the CPU 91 first reads the dedicated map MX for the target one of the cylinders 12 in the water amount information M from the memory 92. Then, based on the dedicated map MX read from the memory 92, the CPU 91 calculates the required flow rate U corresponding to the current engine rotation speed NE and the current engine load factor KL as the target injection flow rate. In this manner, the CPU 91 calculates the target water injection amount for each of the four cylinders 12. The CPU 91 calculating the target water injection amount corresponds to the CPU 91 acquiring the target water injection amount. In this way, the CPU 91 acquires the required amount of coolant U for each of the cylinders 12 as the target amount of coolant injection for each of the cylinders 12 based on the coolant amount information M. When the process of step S10 is executed, the CPU 91 performs the process of step S20 as in the first embodiment.

Advantages of the Second Embodiment

In the configuration of the second embodiment, it is possible to obtain the same effects as (1), (2), and (3) of the first embodiment. In addition, in the configuration of the second embodiment, the reference information B can be eliminated from the memory 92. That is, the amount of information to be stored in the memory 92 in relation to the water injection control can be suppressed. This contributes to securing the free space of the memory 92. In addition, in the configuration of the second embodiment, as described below, it is possible to suppress the processing load of the S10 related to the processing of step CPU 91. That is, for example, in the case of the first embodiment, the CPU 91 calculates two parameters, i.e., the reference water amount and the EGR water amount Q, and performs a subtraction process on these two parameters. On the other hand, in the case of the second embodiment, the parameter to be calculated when the CPU 91 acquires the target water injection amount of one of the cylinders 12 is only the required amount of water U. Then, the CPU 91 handles the required amount of water U as it is as the target amount of water injection. Therefore, in the configuration of the second embodiment, the processing load of the CPU 91 can be suppressed.

MODIFIED EXAMPLES

The above embodiments may be modified as described below. The above embodiments and the modified examples described below may be combined as long as there is no technical contradiction.

The unit period is not limited to the examples of the embodiments described above. The unit period may be set to an appropriate length for defining the EGR water amount Q, the reference water amount, and the required water amount U. The unit period may be determined using an absolute time length as a measure instead of determining the combustion cycle of the internal combustion engine 10 and the rotation amount of the crankshaft 11 as a measure.

The water amount parameter that defines the dedicated map MX is not limited to the example of each of the above embodiments. The water amount parameter may be related to the EGR water amount Q. For example, the water amount parameter may be a value obtained by multiplying the EGR water amount Q by a correction coefficient or the like.

The operation parameters that define the dedicated map MX are not limited to the examples of the above embodiments. The operation parameter may be related to the operation state of the internal combustion engine 10. For example, the operation parameter may be the temperature of the gas in each passage. Depending on the operation parameters used, the internal combustion engine 10 may be equipped with sensors, for example temperature sensors, which are necessary for the CPU 91 to know the current values of the operation parameters.

The number of operation parameters associated with the water amount parameter in the dedicated map MX is not limited to the example of the above embodiment. In the dedicated map MX, a corresponding relationship between one or more operation parameters and the water amount parameter may be defined.

Similarly to the above-described modification example, regarding the reference information B of the first embodiment, the number of operation parameters associated with the reference water amount is not limited to the example of the above-described embodiment.

The format of the dedicated map MX is not limited to a graph. For example, the dedicated map MX may be a mathematical expression. The format of the dedicated map MX is not particularly limited as long as the dedicated map MX represents the corresponding relationship between the operation parameter and the water amount parameter.

Similarly to the above-described modification, regarding the reference information B of the first embodiment, the format of the reference information B is not limited to the example of the above-described embodiment.

The overall configuration of the internal combustion engine 10 is not limited to the example of the above embodiment. For example, the number of the cylinders 12 may be changed from the example of the above embodiment. The type of the forced-induction device 40 may be changed from the example of the above embodiment. For example, the forced-induction device 40 may be of a nozzle vane type. The forced-induction device 40 may be omitted from the internal combustion engine 10. The intercooler 23 may be eliminated in accordance with the elimination of the forced-induction device 40. The water injection valve 60 may be changed to a type that directly injects water into the cylinder 12.

The water injection valve 60 can supply water into the cylinder 12, and may be provided for each cylinder 12. The fuel injected by the fuel injection valve 14 may be other than hydrogen gas. The fuel injected by the fuel injection valve 14 may be, for example, gasoline. The fuel injection valve 14 may be of a type that supplies fuel into the cylinder 12 via the intake passage 20. The internal combustion engine 10 may include the plurality of cylinders 12, the water injection valve 60 for each of the cylinders 12, the EGR passage 50 connecting the intake passage 20 and the exhaust passage 30, and the EGR cooler 52 located in the middle of the EGR passage 50.

In a case where the configuration of the internal combustion engine 10 is changed from the example of the embodiment, the content of the dedicated map MX is also changed accordingly. For example, when gasoline is adopted as the fuel injected by the fuel injection valve 14, the experiment or simulation for creating the dedicated map MX is performed on the assumption that the fuel injected by the fuel injection valve 14 is gasoline. The dedicated map MX represents the corresponding relationship between the operation parameter and the water amount parameter when the fuel of the internal combustion engine 10 is gasoline. In this way, the dedicated map MX and thus the water amount information M dedicated to the target internal combustion engine 10 are created in advance. Therefore, depending on the configuration of the internal combustion engine 10, the water amount information M may not represent the correspondence between the operation parameter and the water amount parameter for the following two cases. One of the two cases is a case where the fuel of the internal combustion engine 10 is hydrogen gas. The other of the two cases is a case where the forced-induction device 40 is in operation.

In the first and second embodiments described above, the controller 90 includes a central processing unit (CPU) 91, a random access memory (RAM), and a read only memory (ROM). The controller 90 executes software processing. However, such a configuration is merely an example. For example, the controller 90 may include a dedicated hardware circuit that processes at least a part of the software processing executed in the above-described embodiment. The dedicated hardware circuit is, for example, an application specific integrated circuit (ASIC). Specifically, the controller 90 may only have any of the following configurations (a) to (c). (a) The controller 90 includes a processor that executes all processes according to a program and a program storage device such as a ROM that stores the program. In other words, the controller 90 includes a software execution device. (b) The controller 90 includes a processor that executes part of processes according to a program and a program storage. The controller 90 further includes a dedicated hardware circuit that executes the remaining processes. (c) The controller 90 includes a dedicated hardware circuit that executes all processes. There may be more than one software execution device and/or more than one dedicated hardware circuit. Specifically, the above-described processes may be executed by processing circuitry including at least one of a software execution device and a dedicated hardware circuit. The processing circuitry may include more than one software execution device and/or more than one dedicated hardware circuit. Program storage devices or computer-readable storage media include storage devices which can be any available media that can be accessed by a general purpose or special purpose computer.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller for an internal combustion engine, the internal combustion engine including an engine main body in which a plurality of cylinders are defined, a plurality of water injection valves respectively provided for the plurality of cylinders and configured to supply water to the plurality of cylinders, an exhaust gas recirculation (EGR) passage configured to draw some of exhaust gas flowing through an exhaust passage into an intake passage as an EGR gas, and an EGR cooler arranged in the EGR passage and configured to cool the EGR gas, the controller comprising:

processing circuitry; and a storage unit, wherein an amount of condensed water generated in the EGR passage and flowing into one of the plurality of cylinders during a unit period is referred to as an EGR water amount, the storage unit stores information indicating a corresponding relationship between an operation parameter related to an operation state of the internal combustion engine and a water amount parameter related to the EGR water amount for each of the plurality of cylinders, when the internal combustion engine is operating, the processing circuitry is configured to:

execute a first process for each of the plurality of cylinders based on the information, the first process acquiring a target water injection amount of a subject cylinder of the plurality of cylinders by subtracting the EGR water amount of the subject cylinder from a reference water amount that corresponds to the operation state of the internal combustion engine; and execute a second process that controls the plurality of water injection valves so that the water injection valves each injects the target water injection amount.

2. The controller according to claim 1, wherein the internal combustion engine uses hydrogen gas as fuel, and the information indicates the corresponding relationship between the operation parameter and the water amount parameter when the fuel of the internal combustion engine is the hydrogen gas.

3. The controller according to claim 1, wherein the internal combustion engine includes a forced-induction device configured to perform forced induction of intake air flowing through the intake passage, and the information indicates the corresponding relationship between the operation parameter and the water amount parameter when the forced-induction device is operating.

4. A non-transitory computer-readable storage medium storing a program for an internal combustion engine, the internal combustion engine including an engine main body in which a plurality of cylinders are defined, a plurality of water injection valves respectively provided for the plurality of cylinders and configured to supply water to the plurality of cylinders, an exhaust gas recirculation (EGR) passage configured to draw some of exhaust gas flowing through an exhaust passage into an intake passage as an EGR gas, and an EGR cooler arranged in the EGR passage and configured to cool the EGR gas, wherein an amount of condensed water generated in the EGR passage and flowing into one of the plurality of cylinders during a unit period is referred to as an EGR water amount, a controller for the internal combustion engine stores information indicating a corresponding relationship between an operation parameter related to an operation state of the internal combustion engine and a water amount parameter related to the EGR water amount for each of the plurality of cylinders, when the internal combustion engine is operating, the program causes the controller to:

execute a first process for each of the plurality of cylinders based on the information, the first process acquiring a target water injection amount of a subject cylinder of the plurality of cylinders by subtracting the EGR water amount of the subject cylinder from a reference water amount that corresponds to the operation state of the internal combustion engine; and execute a second process that controls the plurality of water injection valves so that the water injection valves each injects the target water injection amount.

* * * * *